Patented July 14, 1925.

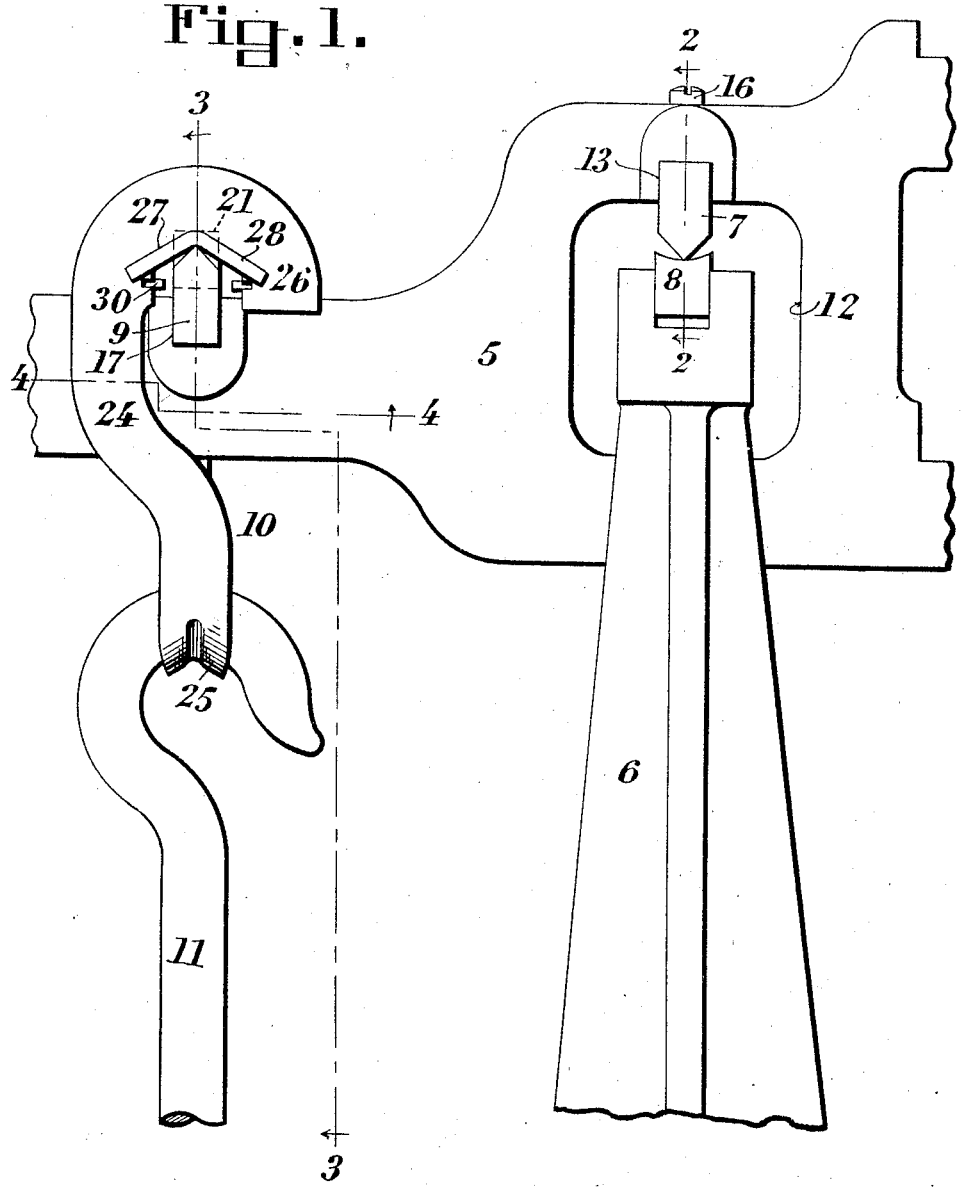

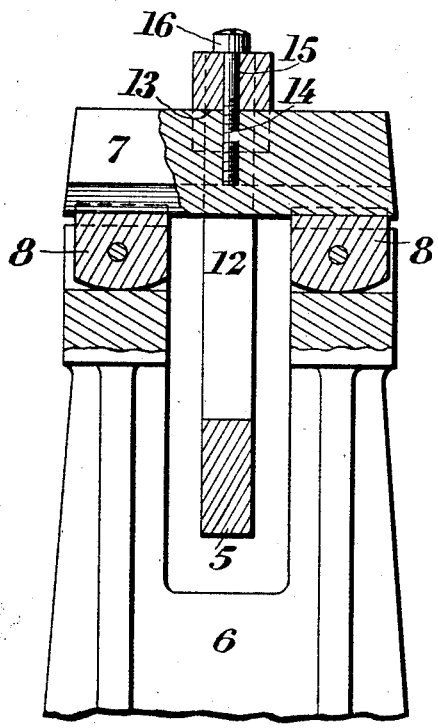
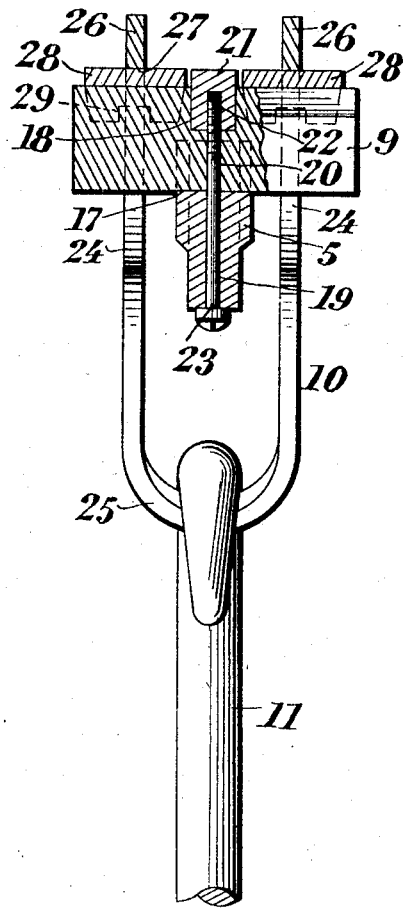
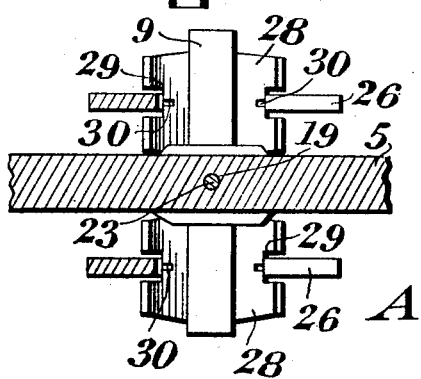

1,545,478

UNITED STATES PATENT OFFICE.

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE BEARING.

Application filed February 14, 1925. Serial No. 9,116.

*To all whom it may concern:*

Be it known that I, ALFRED BOUSFIELD, a citizen of the United States of America, residing at St. Johnsbury, in the county of Caledonia and State of Vermont, have invented certain new and useful Improvements in Scale Bearings, of which the following is a full, clear, and exact description, such as will enable others skilled in the art to which it appertains to make and use the same.

This invention relates to means employed for securing bearing pivots in scale beams, levers, or the like. The accuracy of scales depends upon their bearings. The general practice is to form beams of cast or rolled bars and drive slightly tapered pivots into holes made in the bars. In production manufacture variations are bound to occur in both the pivots and the beam. Frequently the beams are staked to hold the pivots in place. This is a crude method of correcting errors owing to the fact that staking is uncertain and offers very little surface support to the pivots. Another objection is due to the fact that when the pivots are fitted into the beams and it becomes necessary to renew a pivot it requires considerable labor and great skill to properly fit and accurately set the renewal. By the prior methods the pivots and the beams cannot be commercially made so accurate as to make the pivots interchangeable.

The prime object of the present invention is to so construct scale beams and the pivots therefor, that it is possible to readily remove the pivots and substitute others when renewal is necessary.

This object is attained by providing an accurately adjustable and readily removable means for securely clamping the pivots in openings in the beams. The two pivots illustrated and described have extremely heavy bodies, with knife edge bearings, one of the pivots being arranged with its sharp edge up, while the other is shown with its sharp edge down. The particular shape of the pivots shown and their exact positions with relation to the scale beam are not essential to the invention. The shape and positions may be changed to meet varying conditions. However, in the illustrated embodiment of my invention herein shown and described, the pivots have a rectangularly shaped body that is mounted in a correspondingly formed recess in the beam, the height of the body of the pivots being considerably greater than their width, whereby great strength is provided for, and undue bending of the pivot prevented. Furthermore, this construction enables the knife edge of the pivots to be located at a greater distance from the beam than has been possible heretofore with the ordinary type of pivot.

Other objects will be in part obvious in connection with the following description, and will be in part pointed out in connection therewith.

The invention accordingly comprises the features of construction, combination of elements, and arrangement of parts which will be exemplified in the construction hereinafter set forth, and the scope of the application of which will be indicated in the claims.

For a complete understanding of the nature and objects of the invention, reference is had to the following detailed description and to the accompanying drawings wherein—

Figure 1 is an elevation of a portion of a weigh-beam showing the application of my invention thereto;

Fig. 2, is a vertical transverse section taken on the line 2—2 of Fig. 1;

Fig. 3, is a similar view taken on the line 3—3 of Fig. 1; and

Fig. 4, is a horizontal section taken on the line 4—4 of Fig. 1.

As shown, the weigh-beam 5 is supported upon a stand 6, a knife edge pivot 7 with which the beam is provided being mounted in concaved bearing seats 8 pivoted in the top of the stand. Rearwardly of the pivot 7, the beam is provided with another knife edge pivot 9, from which is suspended a loop 10, that is connected to the lever system of the scale (not shown) through a rod 11, the upper end of the rod being hooked into the loop in the usual manner. The pivot 7 is mounted in the beam with its sharp edge down, while the pivot 9 is arranged with its sharp edge up, the apexes of both pivots lying in substantially the same horizontal plane. Furthermore, the beam is so shaped that the pivot 9 can be positioned along the upper edge thereof, while the pivot 7 is located in an opening 12 formed in the body of the beam.

Both pivots are detachably mounted in the beam. As particularly shown by Fig. 2, the upper part of the beam above the opening 12 is thickened, and a rectangularly shaped notch 13 is formed in such thickened part. The bearing 7 is tightly fitted in the notch 13, and is disposed transversely of the beam so that its free ends can project outwardly from the beam for the purpose of providing a long bearing surface. A threaded opening 14 is formed in the bearing 7 in alinement with an opening 15 extending downwardly through the beam, and a cap screw 16 having its shank passed through the opening 15, and its end threaded into the bearing 7, serves as means for retaining the bearing in fixed position within the notch 13.

As particularly shown by Fig. 3, a rectangular notch 17 is formed in a thickened portion of the upper edge of the beam for the reception of the pivot 9, the knife edge of such pivot being up and having a slot 18 cut therein. A vertical opening 19 is drilled through the beam. The pivot has a similar opening 20 therein, which opening communicates with the notch 17, and aligns with the opening 19, when the parts are assembled. A rectangular block 21, having a threaded recess 22 in its bottom, is tightly fitted in the slot 18, the upper part of the block projecting above the knife edge of the pivot, as clearly shown. The pivot 9 is held in position by means of a bolt 23 that is passed upwardly through the openings 19 and 20 and screwed into the block 21. Thus it will be seen that the block functions as a nut for the bolt 23, and also as an antifriction stop for limiting the lateral movement of the loop 10 with respect to the beam, as will be hereinafter more fully described.

The loop 10 is preferably made in the form of a U (see Fig. 3) so as to provide a pair of spaced limbs 24, that are adapted to be disposed on each side of the beam 5 and be suspended from the pivot 9. The loop is constructed slightly different from those heretofore used for the similar purpose. Its limbs extend upwardly from the curved bottom 25, and then they are offset rearwardly, then upwardly, and then bent forwardly and downwardly, so as to provide hook-like members 26 of inverted U form.

The center of the undersides of the members 26 are formed inclined, like an inverted V, so as to provide a seat 27 for receiving a correspondingly shaped bearing plate 28. The plates are preferably made somewhat wider than the seats 27, and notches 29 are cut into the lateral sides of the plates, so that the edges of the loop adjacent to the seats 27 may pass therethrough. In this manner, the plates will be prevented from sliding from their seats.

For the purpose of retaining the plates in position, lugs 30 are struck up from the sides of the loop adjacent each end of the plates. The notches 29 are made wide enough so the edges thereof will loosely engage with the sides of the portions 26, and the lugs 30 are spaced slightly from the plates. In this manner a freedom of rocking movement between the plates and the loop is provided for, and the plates will automatically adjust themselves to the proper position for contacting with the knife edges of the pivot 9.

As an open passageway is formed by the hooklike members 26 of the loop, when the parts of the scale are being assembled, the loop can be readily hooked over the pivot 9, as will be readily understood, with the plates 28 lying on each side of the block 21. Furthermore, as shown, the inner edges of the plates will be slightly spaced from the adjacent sides of the block. This disposition of the parts is such as to permit shifting of the loop with respect to the beam when the parts are displaced, but the arrangement of the parts is such that the plates 28 will be prevented by the block 21 from sliding off of the pivot.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described my invention, what I claim and desire to secure by Letters Patent, is:—

1. In a scale, the combination with a weighbeam having a notch formed therein, of a pivot mounted in said notch, a slot formed in the top of the pivot, a block seated in said slot, and a bolt extending upwardly through the beam and pivot and into said block.

2. In a scale, the combination with a weighbeam having a notch formed therein, of a pivot mounted in said notch, a slot formed in the upper surface of the pivot, a bolt extending upwardly through the beam and pivot, and a block fixed in the slot in the pivot, said block having a threaded recess in its bottom for receiving the upper end of the bolt whereby the pivot will be clamped to the beam.

3. In a scale, the combination with a weighbeam having a notch formed therein, of a pivot mounted in said notch, a slot formed in the upper surface of the pivot, and means passing through said beam and pivot and held by said slot for clamping the pivot to the beam.

4. In a scale, the combination with a weighbeam having a notch formed therein, of a pivot mounted in said notch, a slot formed in the upper surface of the pivot, a bolt extending upwardly through the beam and pivot, a block fixed in the slot of the pivot, said block having a threaded recess in its bottom for receiving the end of the bolt, whereby the pivot will be clamped to the beam, said block also extending upwardly from the pivot, a loop suspended from the beam, said loop having spaced sides terminating in an inverted U-shaped portion, and bearing plates loosely mounted in the ends of the loop, said plates being carried by the pivot on opposite sides of the said block, whereby the block will limit the lateral movement of the loop with respect to the beam.

In testimony whereof, I hereunto sign my name.

ALFRED BOUSFIELD.